United States Patent [19]

Oguma et al.

[11] 3,781,048
[45] Dec. 25, 1973

[54] IMPACT ABSORBING DEVICE FOR BUMPERS

[75] Inventors: Masaaki Oguma, Tokyo; Mitsugi Kurosaki, Yokosuka City, both of Japan

[73] Assignee: Nissan Motor Company Limited, Kanagawa-ku, Yokohama City, Japan

[22] Filed: Apr. 17, 1972

[21] Appl. No.: 244,649

[30] Foreign Application Priority Data
Aug. 27, 1971   Japan.............................. 46/76758

[52] U.S. Cl........................ 293/89, 293/85, 293/88, 267/9 R
[51] Int. Cl. ........................ B60r 19/08, B60g 13/02
[58] Field of Search............. 105/197 D; 267/9 A, 267/9 B, 9 R; 213/60, 22, 30; 293/60, 70, 85, 293/86, 88, 89; 188/1 B

[56] References Cited
UNITED STATES PATENTS

| | | | |
|---|---|---|---|
| 2,084,638 | 6/1937 | Goodwin | 105/197 D |
| 2,525,976 | 10/1950 | Tillou | 267/9 B |
| 2,733,915 | 2/1956 | Dentler | 267/9 A |
| 1,825,086 | 9/1931 | Ohlendorf | 293/85 |
| 1,599,770 | 9/1926 | Jones | 293/86 |
| 709,999 | 9/1902 | McCord | 267/9 A |
| 2,186,137 | 1/1940 | Halladay | 293/85 |

Primary Examiner—Gerald M. Forlenza
Assistant Examiner—Robert Saifer
Attorney—John Lezdey

[57] ABSTRACT

The deformation of an impact absorbing device as caused when the device is subjected to an impact is restrained in a predetermined direction so that the device is capable of properly operating even though localized force or forces are imparted to the device. The impact absorbing device is made up of resilient spring means, a pair of support members holding the resilient spring means therebetween, and a pair of slide plates which project perpendicularly inwardly from the support members and which are clamped together in a manner to be slidable on each other so as to be moved in opposite directions when the resilient spring means is subjected to a compressive stress and accordingly the spaced support members are moved toward each during a condition in which the device is encountering an impact. The device is usually combined with a fender to make up a bumper for vehicles.

9 Claims, 9 Drawing Figures

PATENTED DEC 25 1973 3,781,048

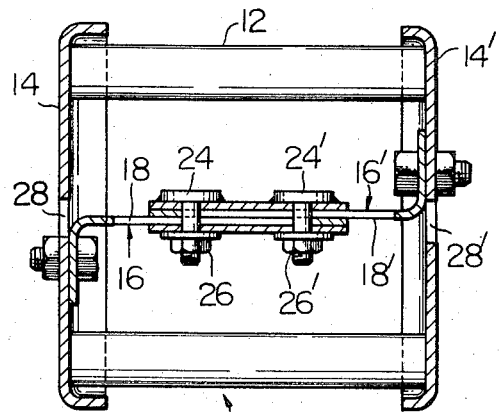
Fig. 6
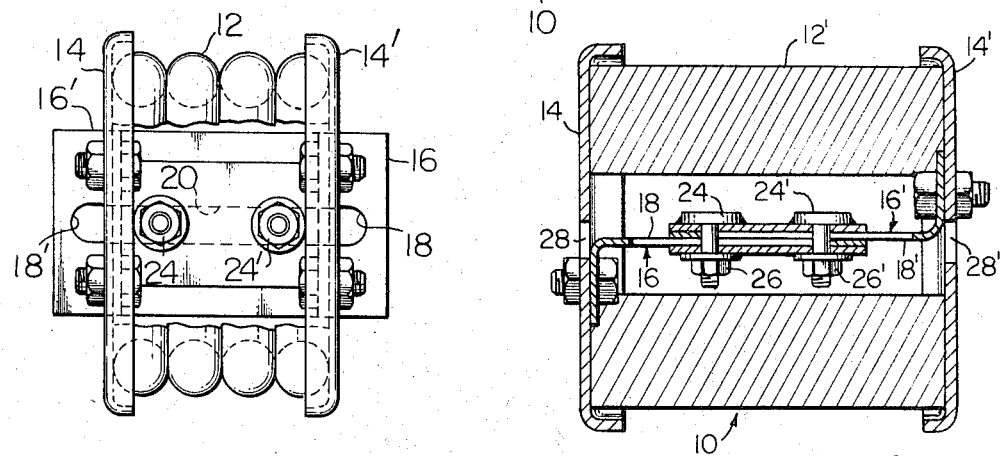
Fig. 7
Fig. 8
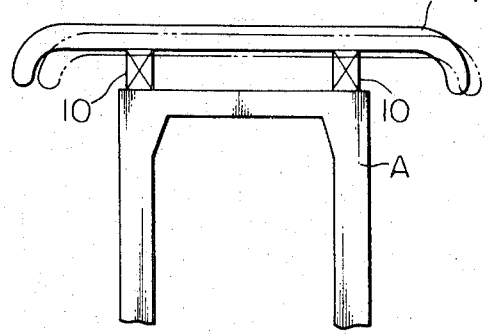
Fig. 9

IMPACT ABSORBING DEVICE FOR BUMPERS

The present invention relates to impact absorbers and has its particular reference to impact absorbing devices which are for use in various kinds of land vehicles such as automotive vehicles, buses, trucks, trains and so forth.

The land vehicles are usually equipped with bumpers which are adapted to absorb energy of mechanical impacts to which the vehicle are subjected during frontal or rear-end collision with moving or stationary obstructions so as to protect the vehicle occupants and vehicle bodies and, in some cases, even the obstructions. The bumpers are largely made up of fenders which are positioned at the front and rear of the vehicle bodies and shock absorbers which are mounted between the fenders and structural parts of the vehicle bodies. When collisions are encountered by the vehicles during operation, the fenders strike directly against the obstructions so that the shock absorbers intervening between the fenders and vehicle bodies are caused to contract in the fore-and-aft direction of the vehicles thereby to absorb the energy of inertia resulting from the impact. A drawback is pointed out in connection with such bumpers in that the fenders and even the shock absorbers are deformed uselessly before they lend themselves to absorbing the impact energy in case localized stresses are caused in the bumpers. In this condition, the bumpers fail to properly accomplish the protective purposes and, as a consequence, the vehicle bodies are seriously damaged and the occupants fatally hurt, let alone the damage that will be caused to the obstructions.

An object of the present invention is, therefore, to provide an improved impact absorbing device which is free from this particular drawback.

Another object of the present invention is to provide an improved impact absorbing device for use in land vehicles whereby the safety of the vehicle occupants as well as the vehicle bodies is satisfactorily assured during collision of the vehicles even in the event the impact absorbing device is subjected to localized impact energy.

Still another object is to provide an improved impact absorbing device which is prevented from being uselessly deformed before the device lends itself to absorbing the energy of impact which is imparted to the impact absorbing device.

Still another object is to provide an improved impact absorbing device which is deformed only in a predetermined direction when subjected to an impact so that the energy of impact can be absorbed at a satisfactory efficiency.

Still another object is to provide an improved impact absorbing device which is made up of a relatively small number of component parts and which are easy and economical to manufacture and provides ease of maintenance and servicing.

A further object is to provide a bumper incorporating such improved impact absorbing device for use in various industrial and passenger vehicles.

The impact absorbing device to achieve these and other objects of the present invention is constructed basically in a manner that it comprises resilient means which is compressible when subjected to a compressive stress, a pair of support members which are held in engagement with both ends of the resilient means for supporting the resilient means therebetween, each of the support members having formed therein an elongated aperture, a pair of slide plates respectively projecting perpendicularly from inner faces of the support members and terminating at spacings from the opposite support members, each of the slide members having formed therein an elongated slot extending perpendicularly to the associated support member, the slide plates being partly superposed upon each other so that the elongated slots formed therein form an elongated opening extending intermediate between the support members, and fastening means clamping the slide plates together and holding them stationary relative to the support members when the impact absorbing device is maintained in a rest or inoperative condition.

In the event a mechanical impact is imparted to the impact absorbing device thus constructed, then the support members are forced to approach each other so that the resilient means intervening therebetween is caused to contract in a direction substantially perpendicular to the support members with the result that the slide plates are forcedly moved on each other toward the opposite support members and project outwardly from the opposite support members through the elongated apertures formed respectively therein. One of the support members is usually secured to the fender constituting a bumper and the other of them is secured to the vehicle body, so as to protect the vehicle occupant and the vehicle body in the event of frontal or rear-end collision of the vehicle.

In order that the impact absorbing device above described be maintained in a stabilized position irrespective of the bounding and rebounding of the vehicle during cruising, the resilient means of the device may be held under a preloaded condition thus constantly pressing upon the support members outwardly. This will also proove useful for the purpose of holding the component parts of the device in closely fit positions.

Other objects and features of the impact absorbing device according to the present invention and the usefulness of the bumper using such device will become more apparent from the following description taken in conjunction with the accompanying drawings, in which:

FIG. 6 is a sectional view taken on line VI—VI of FIG. 4;

FIG. 7 is similar to FIG. 4 but now shows an operative condition of the device shown in FIGS. 4 to 6; and FIG. 8 is a schematic top plan view of a bumper using the impact absorbing device of the invention which is so constructed as to be deformable sidewise of the vehicle body.

FIG. 9 is a sectional view similar to that of FIG. 6 but showing another embodiment of the device with a rubber spring.

Figure 1:
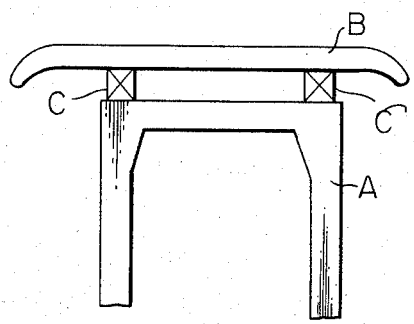
FIG. 1 is a schematic top plan view of an overall construction of a bumper mounted on a vehicle body.
Figure 2:
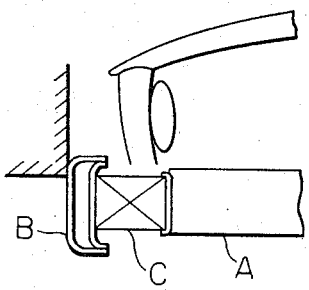
FIG. 2 is a schematic side end view of the bumper which is illustrated in FIG. 1.
Figure 3:
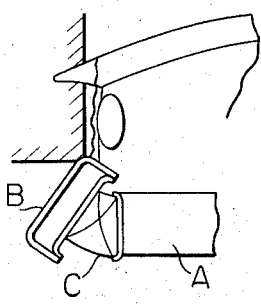
FIG. 3 is a schematic side end view showing a deformed condition of a prior art bumper as caused when the bumper is subjected to a localized compressive stress during collision of the vehicle.

Reference is first made to FIGS. 1 to 3 so as to more clearly show the drawback inherent in the prior art shock absorbers or the bumpers using such shock absorbers.

In order to minimize the impact to the vehicle body and occupant during the frontal or rear-end collision of the vehicle, the vehicle body, generally designated by reference character A, is provided with a bumper which is largely made up of a fender B and a suitable number of shock absorbers C which are positioned between the vehicle body A and fender B. The constructions of the shock absorbers C vary from one to another depending upon the types and applications of the vehicles and the desired operation characteristics of the shock absorbers but are usually such that they are caused to contract toward the vehicle body when the fender is subjected to a violent impact during the collision condition. The nature and degree of deformation of the bumper depends upon the configuration of the bumper in its entirety and the amount and direction of the stress produced in the bumper, as is well known. It is, thus, quite likely that the bumper fails to be properly deformed or moved especially when the bumper is subjected to a localized or irregular stress. In this condition, the bumper is no longer capable of satisfactorily absorbing the energy of impact and, as a consequence, the vehicle occupant and body will be critically endangered. FIG. 3 illustrates an example in which the fender B strikes at its upper end against a lower edge of an obstruction D wherein the bumper is caused to upwardly turned in its entirety so as to lose its impact absorptive ability. The impact absorbing device herein proposed is cleared of such difficulty, as previously mentioned.

Figure 4:
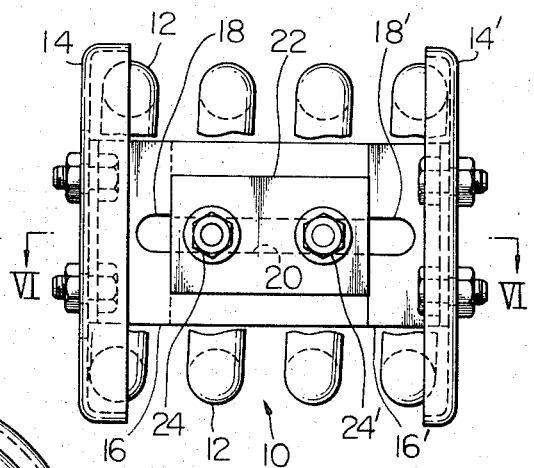
FIG. 4 is a top end view showing a preferred embodiment of the impact absorbing device according to the present invention, the device being shown as held under an inoperative condition.

A preferred embodiment of the impact absorbing device in accordance with the present invention will now be described with reference to FIGS. 4 to 6. As best seen in FIG. 4, the impact absorbing device of the present invention as generally designated by reference numeral 10 has resilient spring means 12. This resilient spring means 12 is herein shown as a coiled compression spring but the same may be constructed in any form and made of any material such as rubber insofar as it becomes contracted when subjected to a compressive stress. The resilient spring means 12 is seated at its opposite ends on a pair of support means 14 and 14' which are positioned at a predetermined spacing from each other. These support members 14 and 14' may be in the form of circular, oval, square or rectangular plates or cylinders although they are herein shown as being in the form of circular, rimmed saucers. A pair of generally L-shaped slide plates 16 and 16' are rigidly secured to inner faces of the support members 14 and 14', respectively, by means of bolts and nuts (not numbered) and extend substantially in parallel to an axis of the resilient spring means 12 toward the opposite support members 14' and 14, respectively, as seen in FIGS. 4 and 6. It is, in this instance, important that the slide plates 16 and 16' project exactly perpendicularly from the inner faces of the associated support members 14 and 14', respectively. The slide plates 16 and 16' have formed therein elongated slots 18 and 18', respectively, which extend substantially perpendicularly to the support members 14 and 14'. The slide plates 16 and 16' are partly superposed on each other as best seen in FIG. 6 so that the individual elongated slots 18 and 18' form an elongated opening 20 extending intermediate between the spaced support members 14 and 14' as seen in FIG. 4. The slide plates 16 and 16' thus partly superposed on each other are clamped together and held stationary relative to the support members 14 and 14' by means of clamping plates 22 and 22' mounted on the outer faces of the slide plates 16 and 16', respectively, and which are connected together by bolts 24 and 24' and nuts 26 and 26'. The bolts 24 and 24' are passed through the elongated opening 20 and located at a predetermined spacing from each other. It is, in this instance, important that the bolts 24 and 24' have stems which are sized to be smaller than the width of the elongated opening 20 so that the slide plates 16 and 16' are movable over distances which are limited by these bolts. Although the bolts 24 and 24' are herein shown as two in number, it is allowable to use three or even more bolts where necessary. In lieu of the combination of the clamping plates 22 and 22' and bolts 24 and 24' as above described, any desired fastening means may be used insofar as the slide plates 16 and 16' are clamped together in a manner to be slidable on each other when they subjected to a force that is exerted longitudinally inwardly thereon.

Figure 5:
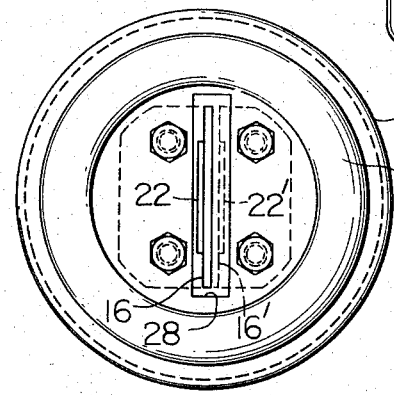
FIG. 5 is a front end view of the impact absorbing device which is illustrated in FIG. 4.

The support members 14 and 14' are formed with elongated apertures 28 and 28' as seen in FIGS. 5 and 6. These apertures 28 and 28' are shaped and located in a manner to be in alignment with the leading end portions of the slide plates 16' and 16, respectively, so as to permit of the passage of the slide plates when they are moved during operation.

The impact absorbing device which is constructed in the above described manner is connected to the vehicle body and the fender of the bumper through the support members 14 and 14' in a suitable manner. In order to assure proper operation of the bumper thus constructed, it is important that the impact absorbing device be positioned in a manner that the slide plates 16 and 16' are strictly perpendicular to the lateral direction of the vehicle.

When, now, the vehicle which is equipped with the bumper using the impact absorbing device according to the present invention encounters a frontal or rear-end collision with an obstruction during cruising, then the impact absorbing device is subjected to a compressive stress which is directed perpendicularly to the support members 14 and 14' or which has at least a component directed perpendicularly to the support members. The resilient spring means 12 is consequently contracted and the slide plates 14 and 14' are caused to move inboardly of the impact absorbing device while being guided by the bolts 24 and 24'. The support members 14 and 14' are accordingly moved toward each other with the result that the slide plates 16 and 16' have their leading end portions projecting outwardly from the opposite support members 14' and 14 through the elongated apertures 26' and 26, respectively. The energy of the impact imparted to the impact absorbing device of the bumper is consumed partly in the forced contraction of the resilient spring means 12 and partly in the sliding movement of the clamped slide plates 16 and 16' in this manner. Such operative condition of the impact absorbing device is illustrated in FIG. 7. The impact absorbing device in this operative condition is advantageously prevented from being rebounded in succession to the collision condition because the reexpansion of the resilient means 12 as would be caused posterior to the contraction condition of the resilient spring means is limited or alleviated by means of the support members 14 and 14' which are restrained by the clamp slide plates 16 and 16'.

In order to reduce the resonance frequency of the upward and downward vibrations of the bumper using the impact absorbing device as caused relative to the vehicle body and to maintain the individual component parts of the bumper in a closely fit condition, it is preferable that the resilient spring means 12 be maintained under a preloaded condition so that the clamping plates 22 and 22' are constantly forced outwardly by means of the support members 14 and 14' and bolts 24 and 24', respectively.

For the purpose of reducing the load on the vehicle body A when the bumper is subjected to an impact in an oblique or sidewise direction as indicated by an arrow in FIG. 8, the slide plates of the impact absorbing device 10 according to the present invention may be made of spring steel. In this instance, the impact absorbing devices 10 as seen in FIG. 8 are permitted to turn sidewise as the fender B is moved in a lateral direction as indicated by phantom lines. The impact absorbing devices thus deformed will readily resume their initial positions when the impact on the fender is removed.

While, as seen in FIGS. 4-6 of the drawings, the preferred embodiment of the impact absorbing device utilizes a coiled spring, it is within the scope of the invention to use other resilient spring means and the use of a rubber spring 12' is illustrated in FIG. 9.

It will now be appreciated from the foregoing description that the deformation of the impact absorbing device according to the present invention is advantageously restrained in a predetermined direction and, as a consequence, the safety of the vehicle body and occupants can be assured satisfactorily even though the impact absorbing device is subjected to localized energy. The impact absorbing device according to the present invention is thus capable of operating in a proper condition substantially without respect of the nature of the impact which is imparted to the bumper using such impact absorbing device.

The impact absorbing device according to the present invention is significantly economical to manufacture and suited for production on a large-sized commercial basis because it is made up of elements which are not only limited in number but interchangeable with each other. The device, moreover, can be readily mounted on the vehicle body and fender without resort to skillful techniques and provides ease of maintenance and servicing during use.

Since the slide plates of the impact absorbing device are permitted to project outwardly of the opposite support members through the apertures formed therein, relatively long strokes are available of the impact absorbing device, thus adding to the cushioning effect of the bumper using such device.

What is claimed is:

1. An impact absorbing device comprising:
   a. A pair of support members arranged in spaced relationship, said support members having wall portions with inner faces thereon, and with said respective inner faces being disposed in facing relationship;
   b. Means defining an elongated aperture in the respective wall portions of each of said support means;
   c. A pair of slide plates disposed on each of said respective wall portions, each of said slide plates having a plate portion thereof projecting perpendicularly from its associated inner face on said wall portion toward, but, when the device is in a rest position, with a leading end thereof terminating short of, the inner face of the other wall portion, each plate portion of said slide plates being disposed so that said plate portion is in alignment with said elongated aperture in said wall portion opposite it, said plate portion of said pair of sliding plates, as so disposed, lying in side by side relationship for at least a portion therealong, each of said plate portions having an elongated slot defined therein and with said respective slots extending in a direction perpendicular to its said associated wall portion of said support member, and with said slots in said respective plate portions being in side by side alignment as thus disposed;
   d. A pair of clamping plates disposed to overlie said pair of slide plates in the area where said plate portions of said slide plates are in side by side relationship, said clamping plates having connecting means extending therebetween and through said aligned elongated slots in said respective plate portions;
   e. Resilient means confined between the said inner surfaces of said respective support members and encompassing the assembled pair of slide plates and clamping plates, whereby when forces are applied to one of said support members tending to move it towards the other support member, said resilient means is compressed in a direction perpendicular to said inner faces, as said slide plates slide over each other in a guide path, and said leading ends of said plate portions are moved through said respective elongated apertures in said support members.

2. An impact absorbing device according to claim 1, wherein said connecting means includes at least two sets of a bolt and nut tightly connecting said clamping plates to each other through said slots in said slide plates and confining said slide plates in slidable engagement with each other.

3. An impact absorbing device according to claim 2, wherein each of said bolts has a stem which is sized to be smaller than a width of said elongated slots.

4. An impact absorbing device according to claim 2, in which said at least two sets of a bolt and nut are located at a predetermined spacing from each other.

5. An impact absorbing device according to claim 1 in which said resilient means comprises a coiled compression spring which is seated at its ends on the inner faces of said support members.

6. An impact absorbing device according to claim 1, in which said resilient means comprises a rubber spring.

7. An impact absorbing device according to claim 1, in which said resilient means is maintained under a preloaded condition when the device is held in the rest condition.

8. An impact absorbing device according to claim 1, in which said slide plates are made of spring steel.

9. A bumper for a vehicle, comprising a fender and a suitable number of impact absorbing devices each of which comprises resilient means which is compressible when subjected to a compressive stress, a pair of support members which are held in engagement with both ends of said resilient means for supporting the resilient means therebetween one of said support members being fast on said fender and the other being connected to the body structure of said vehicle, each of said support members having an elongated aperture formed therein, a pair of slide plates respectively projecting perpendicularly from inner faces of said support members and terminating at spacings from the opposite support members, each of said slide plates being formed with an elongated slot which extends perpendicularly to the associated support member, said slide plates having their leading end portions in alignment with said elongated apertures and being partly superposed on each other so that said elongated slots form a continuous elongated opening extending intermediate between said support members, and fastening means clamping said slide plates together and holding the slide plates stationary relative to said support members when the impact absorbing device is held in a rest condition, said support members being moved toward each other to cause said resilient means to be contracted in a direction perpendicular to said support members and said fender and to cause said slide plates to move until they have their leading end portions projecting outwardly from the opposite support members through said elongated apertures when said fender is subjected to an impact.

* * * * *